United States Patent [19]
Farrow

[11] 3,816,893

[45] June 18, 1974

[54] MILLING CUTTERS

[75] Inventor: Malcolm Farrow, Coventry, Warwickshire, England

[73] Assignee: Wickman Wimet Limited, Coventry, England

[22] Filed: Apr. 13, 1973

[21] Appl. No.: 350,743

[30] Foreign Application Priority Data
Apr. 14, 1972  Great Britain .................... 17381/72

[52] U.S. Cl. ............................................ 29/105 A
[51] Int. Cl. ............................................ B26d 1/12
[58] Field of Search .................... 29/105, 105 A, 97

[56] References Cited
UNITED STATES PATENTS
1,460,030   6/1923   Mattson ............................ 29/105 A
3,175,276   3/1965   Weber et al. ....................... 29/105 A Primary Examiner—Harrison L. Hinson

[57] ABSTRACT

A milling cutter with spaced blades around its periphery, each blade carrying a detachable insert and the inserts being held on the blades by members which exert pressure between the adjacent blade and an insert, and screw means whereby the members can be adjusted to exert such pressure.

5 Claims, 4 Drawing Figures

PATENTED JUN 18 1974 3,816,893

MILLING CUTTERS

This invention relates to milling cutters of the kind comprising a body with a circular periphery, and a plurality of cutting inserts detachably mounted in respective shoes which are themselves detachably secured in the body at spaced positions around the periphery.

The object of this invention is to provide a milling cutter of this kind having a convenient means for securing the inserts in the shoes to enable them to be closely spaced around the periphery of the body.

In accordance with the invention, a milling cutter comprises a body having a plurality of spaced peripheral slots in which are securable respective shoes and members disposed between adjacent shoes, each of said members having a surface engageable with a shoe and a further surface engageable with an insert on an adjacent shoe, the members being provided with respective means whereby pressure is applied through said surfaces to hold the inserts onto adjacent shoes.

Figure 1:
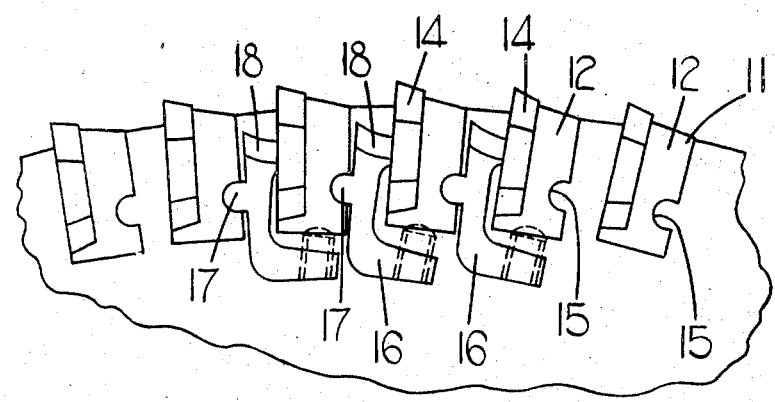
Figure 2:
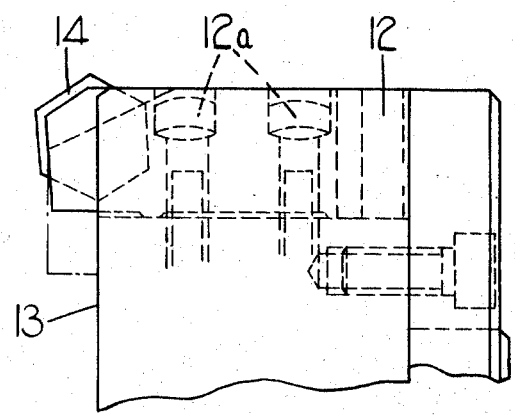
Figure 3:
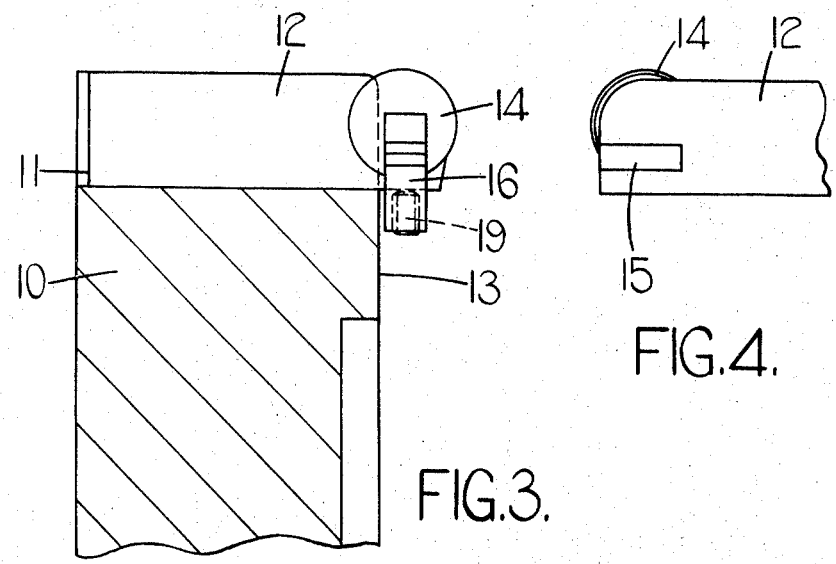
Figure 4:
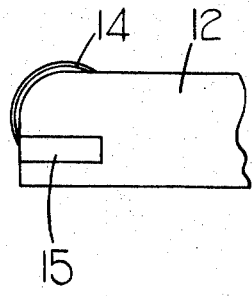

The invention will now be described by way of example with reference to the accompanying drawings in which FIG. 1 is a fragmentary view of a milling cutter constructed in accordance with the invention, FIG. 2 is a side elevation view of the milling cutter, FIG. 3 is a cross-sectional view of an alternative form of milling cutter and FIG. 4 is a side view of one of the shoes of the cutter in FIG. 3.

The milling cutter illustrated in FIGS. 1 and 2, has a generally cylindrical body 10, in which are formed a plurality of peripheral slots 11. The slots contain respective generally rectangular shoes 12 each secured in place by a pair of screws 12a entering the body 10.

Each shoe 12, extends beyond one substantially flat side face indicated at 13 of the body 10. That portion of each shoe 12 extending beyond said surface 13, carries a cutting insert 14. The shape of each of the cutting inserts is a flat hexagon with the sides inclined as shown in the drawings and the inserts are indexable to present alternative cutting portions at the periphery of the milling cutter. Other shapes of insert having polygonal or circular form can be used, the shoes 12 having appropriately shaped recesses to receive such inserts. FIGS. 3 and 4 show a shallow frusto conical shaped insert.

Each shoe 12 has, in it surface which is presented away from the insert 14, an elongated part-cylindrical recess 15. Each such recess 15 extends in the direction of the length of the shoe 12 from the end thereof at which the insert 14 is fitted.

To secure the inserts 14, on their respective shoes 12 there are provided members 16 which are disposed between those portions of adjacent shoes 12 extending beyond the surface 13 of the body 10. (Some of the components are omitted in FIG. 1 for clarity.)

Each such member 16, is of generally L-shape as seen in plan in FIG. 1. The outside face of one limb of the L has an integral part-cylindrical portion 17 which is of a size to engage in the recess 15 in the shoe 12. At the extremity of the same limb of the L is a head 18 which engages the insert 14 of an adjacent shoe. The surfaces provided at 17 and by the head 18 are spaced apart by a distance which is greater than the gap between an insert and an adjacent shoe. The other shorter limb of each member 16 contains a screw 19, which engages an end face of one of the shoes 12.

As shown in FIG. 1, the arrangement is such that an insert 14 is secured onto its shoe 12 by application of pressure through the surface 17 and 18 onto one of the shoes and onto the insert of an adjacent shoe respectively, such pressure being created by engagement of the screw 19 with the end face of said adjacent shoe 12.

This arrangement allows relatively close spacing of the inserts around the periphery of the body and allows ready access to the screws 19 for securing the inserts on the shoes, this being clearly shown in FIG. 3.

I claim:

1. A milling cutter comprising a body having a plurality of spaced peripheral slots in which are securable respective shoes, and members disposed between adjacent shoes, each of said members having a surface engageable with a shoe and a further surface engageable with an insert on an adjacent shoe, the members being provided with respective means whereby pressure is applied through said surfaces to hold the inserts onto adjacent shoes.

2. A milling cutter as claimed in claim 1, in which each of the members disposed between adjacent shoes is provided with a formation for engagement in a cooperating formation in one of the shoes, each formation on the member forming said surface which engages the shoe.

3. A milling cutter as claimed in claim 2, in which the interengaging formations comprise a part-cylindrical portion engaging a part-cylindrical recess.

4. A milling cutter as claimed in claim 1 in which each of the means whereby pressure is applied comprises a screw engaged in the member and bearing upon an adjacent one of the shoes.

5. A milling cutter as claimed in claim 4, in which the members are disposed between portions of the shoes which project beyond the body surface, and the screws being accessible externally of the cutter.

* * * * *